United States Patent [19]

Wolf et al.

[11] Patent Number: 4,482,945
[45] Date of Patent: Nov. 13, 1984

[54] TRANSFORMER FOR LOW DISTORTION RECTIFIER SYSTEM

[75] Inventors: Joachim E. Wolf, Monroeville; Paul H. Watson, Ardara; Raymond J. Radus, Monroeville, all of Pa.

[73] Assignee: Westinghouse Electric Corp., Pittsburgh, Pa.

[21] Appl. No.: 445,124

[22] Filed: Nov. 29, 1982

[51] Int. Cl.³ ............................................. H02M 7/155
[52] U.S. Cl. ..................................... 363/129; 336/62; 336/183
[58] Field of Search ...................... 363/2, 3, 4, 5, 36, 363/64, 129, 152, 153, 154; 336/62, 183

[56] References Cited

U.S. PATENT DOCUMENTS 4,255,784  3/1981  Rosa .................................... 363/129

Primary Examiner—William M. Shoop
Assistant Examiner—Anita M. Ault
Attorney, Agent, or Firm—C. M. Lorin

[57] ABSTRACT

A coil for a 12-pulse transformer-rectifier apparatus assembled on a three-leg magnetic core comprising a half primary winding sandwiched between two half secondary windings of substantially the same height as the half primary winding. A pair of coils associated with one leg of a three-leg magnetic core in a 12-pulse transformer-rectifier, are oriented in opposition to one another, and have all their terminal conductors extending parallel to one another with transversal connectors in closely-related parallel planes.

15 Claims, 45 Drawing Figures

| U | U | U | FIG. 7A |
| ∩ | ∩ | ∩ | |

| ∩ | ∩ | ∩ | FIG. 7B |
| U | U | U | |

| ∩ | U | ∩ | FIG. 7C |
| U | ∩ | U | |

| U | ∩ | U | FIG. 7D |
| ∩ | U | ∩ | |

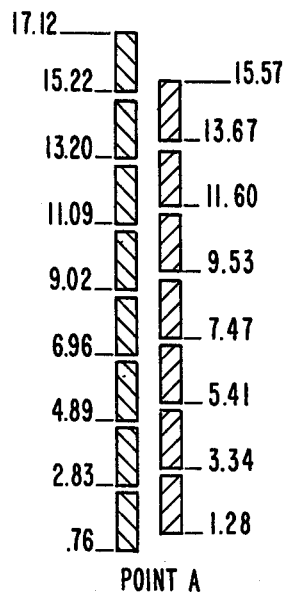
FIG. 9A (POINT A)
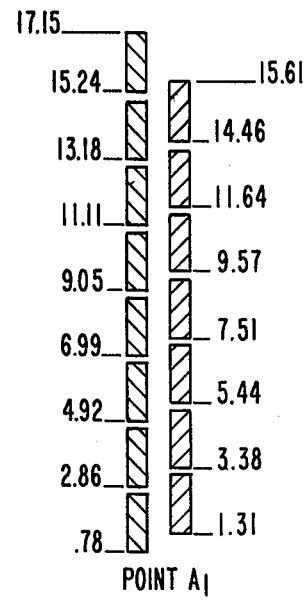
FIG. 9B (POINT A₁)
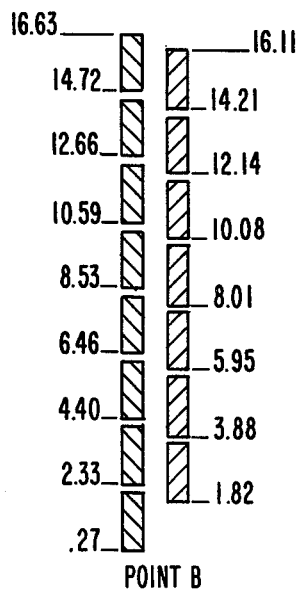
FIG. 10A (POINT B)
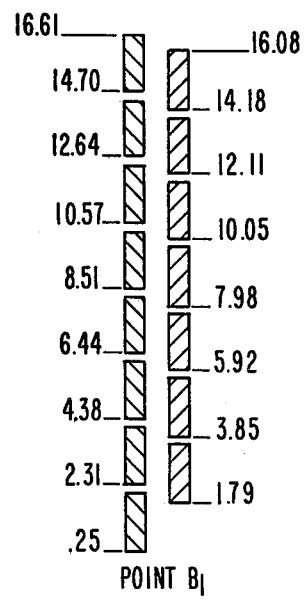
FIG. 10B (POINT B₁)

 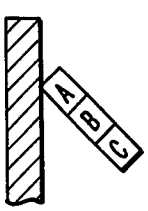 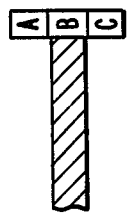 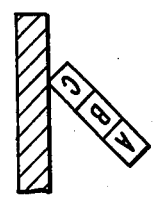 
FIG. 14A   FIG. 14B   FIG. 14C   FIG. 14D   FIG. 14E
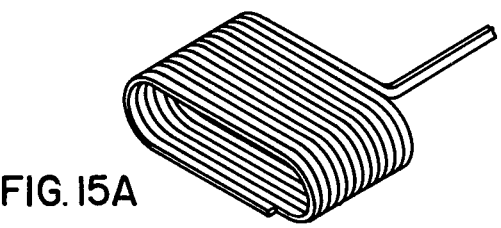
FIG. 15A
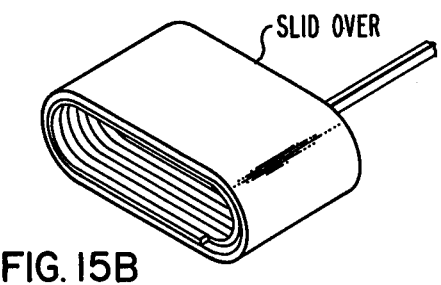
FIG. 15B
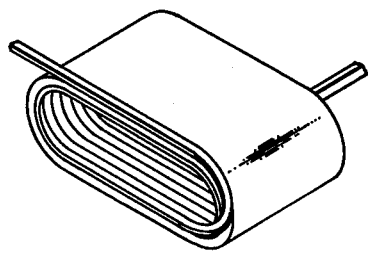
FIG. 15C
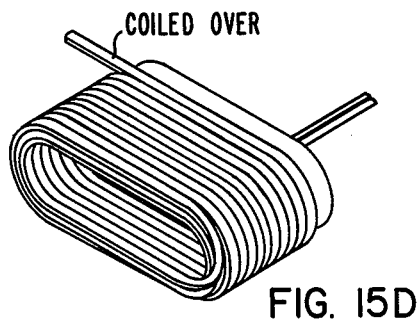
FIG. 15D

TRANSFORMER FOR LOW DISTORTION RECTIFIER SYSTEM

BACKGROUND OF THE INVENTION

The invention relates to electrical transformers in general and more particularly to a hexagon transformer as can be used for AC to DC power conversion in a 12 pulse transformer/rectifier arrangement.

The invention is particularly applicable to transformer/rectifier apparatus such as described in U.S. Pat. No. 4,255,784 of John Rosa. As explained in the patent, a hexagon transformer/rectifier scheme has been implemented with a single three-phase transformer having two identical secondary windings per phase between which the associated primary winding can be sandwiched. Such an arrangement allows a symmetrical construction resulting in well matched voltages and leakage reactances and leading to a significant reduction in the input a.c. harmonic distortion levels and d.c. output ripple level. The major problem in the implementation of a hexagon transformer such as suggested in the Rosa patent is due to the fact that a thee-leg magnetic core lies in a plane about a center leg, whereas the hexagon is vectorially distributed evenly in space. Therefore, in the conventional magnetic core, the leakage inductance between the primary and secondary windings which are wound on the center leg of the magnetic core is different from the leakage inductances relative to the outer legs. In addition, the leakage inductances have to be equal for the two ends of each of the six secondary windings in order to avoid an asymmetry. Beside the symmetry problem, with a three leg magnetic core the high leakage inductance causes relatively large stray magnetic fields in the vicinity of the two outer transformer legs. As a result, metallic objects in close proximity will affect the leakage inductances. Also, undesirable losses and heat problems may result due to the presence of nearby cabinet walls or coupling structures.

SUMMARY OF THE INVENTION

In a 12-pulse transformer/rectifier apparatus of the type disclosed in U.S. Pat. No. 4,255,784 of John Rosa, six identical coils are assembled by pairs on a three-leg magnetic core, each coil comprising: a half-primary winding sandwiched between secondary winding portions obtained by folding the secondary about its middle point to the height of the half primary winding, and placing each coil in opposition to the other coil of the same leg, while keeping a symmetry about the central leg.

The invention allows to achieve a hexagon transformer with a planar three-phase three-legged magnetic core.

According to the invention six coils, each comprising one half primary winding sandwiched between two half secondary windings, are mounted on the magnetic core so that each leg carries two such sets of coils pertaining to opposite sides of the hexagon. The two half secondary windings relative to one half primary winding in a coil have a common end and respective start and finish leads of opposite polarities, each such start lead being connected to the start lead of the secondary winding of one adjacent coil and each such finish lead being connected to the finish lead of the secondary winding of the other adjacent coil along the hexagon.

The coils are assembled on a three-leg magnetic core comprising a half primary winding sandwiched between two half secondary windings of substantially the same height as the half primary winding. A pair of coils associated with one leg of a three-leg magnetic core in a 12-pulse transformer-rectifier, are oriented in opposition to one another, and have all their terminal conductors extending parallel to one another with transversal connectors in closely-related parallel planes.

BRIEF DESCRIPTION OF THE DRAWINGS

FIGS. 7A–7D are a schematic representation of four different secondary winding configurations on the magnetic core of FIGS. 4 and 5;

FIGS. 9A, 9B, 10A, 10B and 11A, 11B; are cross-sections of an actual secondary winding along respective plane traces $(a, a_1)$, $(b, b_1)$, and $(c, c_1)$ which are defined on FIG. 8C along the projected base.

FIGS. 14A–14E illustrate the successive orientations of the conductor of FIGS. 13A–13C during the transition and transposition process for respective sections A—A, B—B, C—C, D—D and E—E thereof;

FIGS. 15A–15D illustrate four successive steps in the winding procedure for one coil;

DETAILED DESCRIPTION OF THE INVENTION

Figure 1:
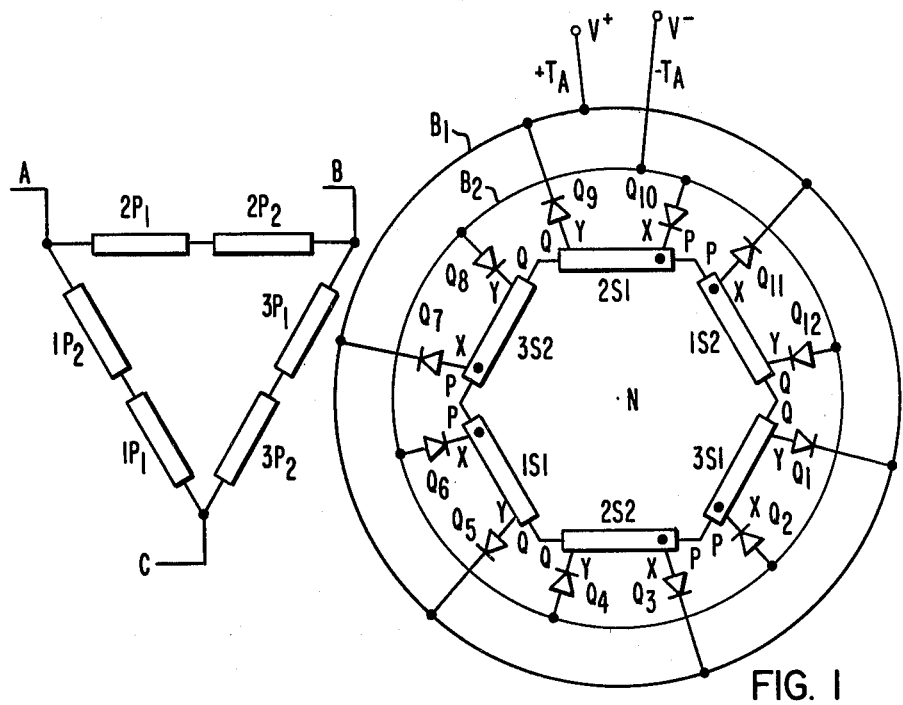
FIG. 1 is descriptive of an hexagon transformer improved over the one exemplified in U.S. Pat. No. 4,255,784 of John Rosa.

Referring to FIG. 1, a transformer-rectifier apparatus like disclosed in U.S. Pat. No. 4,255,784 of John Rosa is shown modified according to the present invention. The three-phase primary connected in delta includes two half primary windings per phase (1P1, 1P2), (2P1, 2P2) and (3P1, 3P2). The six secondary windings (1S1, 1S2), (2S1, 2S2), and (3S1, 3S2) are disposed vectorially in space along the six sides of a regular hexagon. These six windings pertain to six coils which include respective half primary windings. The notation indicates for each coil on which leg of the magnetic core the secondary winding and the associated half primary winding are located (first digit is 1 for the left leg, 2 for the central leg, 3 for the right leg), and whether the coil is high or low on the leg (last digit is 1 for up, 2, for low). A three-legged magnetic core which is planar includes a central leg and two outer-legs. As generally known, upper and lower magnetic cores are provided transverse to the legs. One half primary and two half secondary windings are coupled to form a coil, two such coils being mounted on each leg (see FIG. 3). The half primary windings are in pairs on opposite sides of the hexagon.

As disclosed in the Rosa patent, each secondary windings (1S1, 1S2), (2S1, 2S2), (3S1, 3S2) has two taps X and Y, one on each half secondary winding. The taps are located toward opposite ends and at such distance therefrom that the successive taps along the consecutive secondary windings form a 12 pulse distribution in relation to the rectifier section connected to the transformer. These taps (X,Y) are connected through corresponding rectifiers ($Q_1$-$Q_{16}$) to respective busses (B1, B2), alternatively in one direction, or in the opposite direction, from one tap to the next, these busses being of opposite polarities and being connected to terminals $+T_A$ for $B_1$, $-T_B$ for $B_2$. Thus, the AC power supply from phase lines A, B, C is converted, as disclosed in the Rosa patent, into DC voltage between terminals $+T_A$, $-T_B$ of potential $\pm V$.

Figure 3:
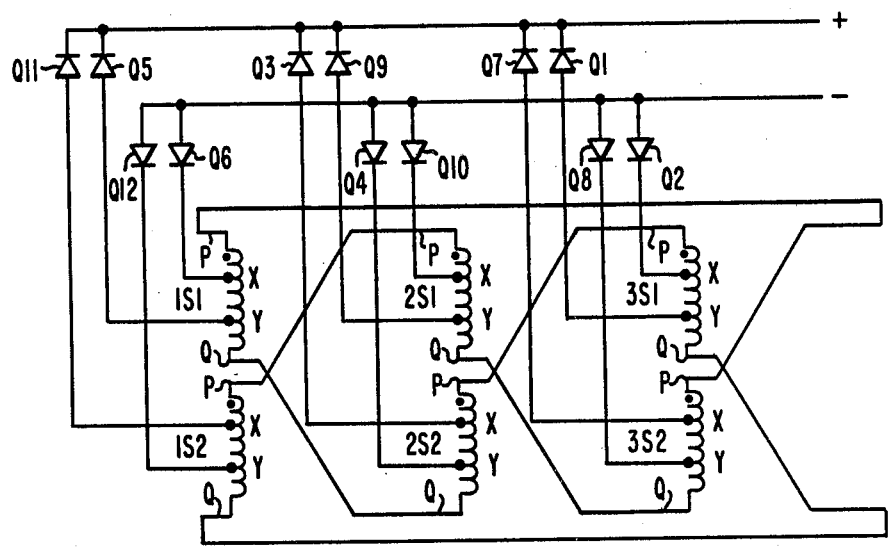
FIG. 3 is a schematic representation of the circuit of FIG. 1 with the secondary windings on three parallel legs of the magnetic core.

Referring to FIG. 3, the six secondaries are illustrated as disposed on the three legs of the magnetic core in accordance with the previous notation. The dots indicate for each winding the polarity, and the interconnecting leads P, Q identify the matching polarities between successive secondary windings of the hexagon. Hereinafter, a P lead will be designated as a "start" lead of the winding and a Q lead as a "finish" lead of the winding.

Figure 2:
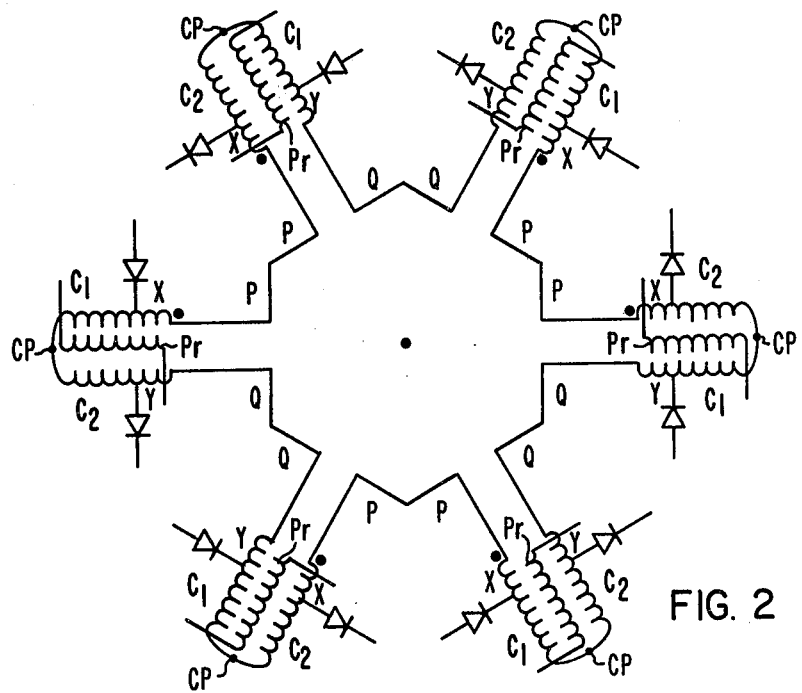
FIG. 2 schematically represents six coils oriented about the six sides of a regular hexagon, where each coil includes one half primary winding sandwiched between two half secondary windings.

Referring to FIG. 2, each secondary winding 1S1 through 3S2 is schematically shown to include two halves $C_1$ and $C_2$ between which the associated primary is sandwiched. For the sake of clarity, FIG. 2 shows two halves side by side relative to the associated intermediate primary coil Pr. In fact, according to the present invention, one half-secondary (hereinafter designated LW for inner winding) is coiled inside the primary coil downward to the middle point CP, and the other half secondary winding (hereinafter designated OW for outer winding) is coiled outside the half primary winding Pr upward from the middle point CP. Moreover, two consecutive half-secondary windings C1, C2 along the hexagon have the same polarity relationship, with a finish lead Q, or with a start lead P. The adjoining symbols P, or Q, between consecutive secondary windings on the hexagon are the same, and FIG. 2, account for this fact.

Figure 4:
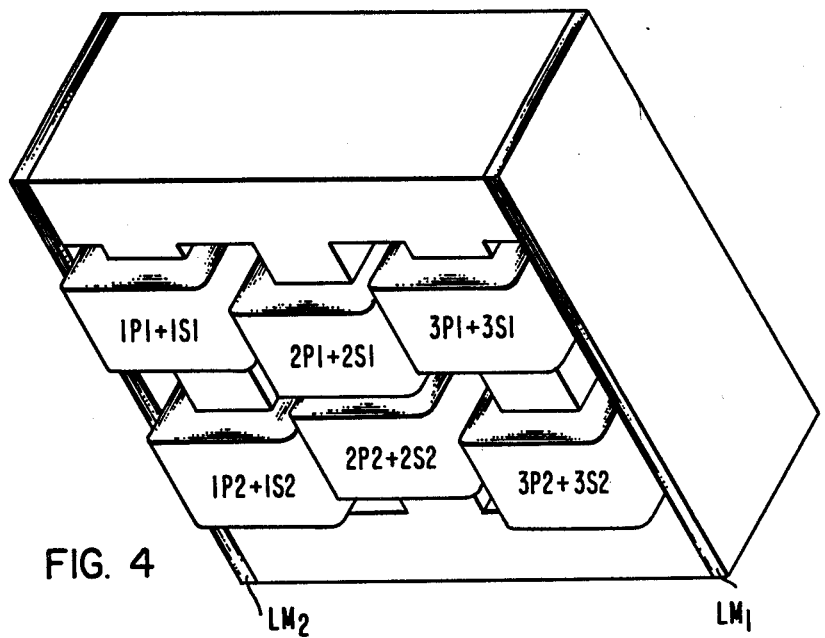
FIGS. 4 and 5 are two views of the six coils of FIG. 2 mounted on a three-leg planar magnetic core.
Figure 5:
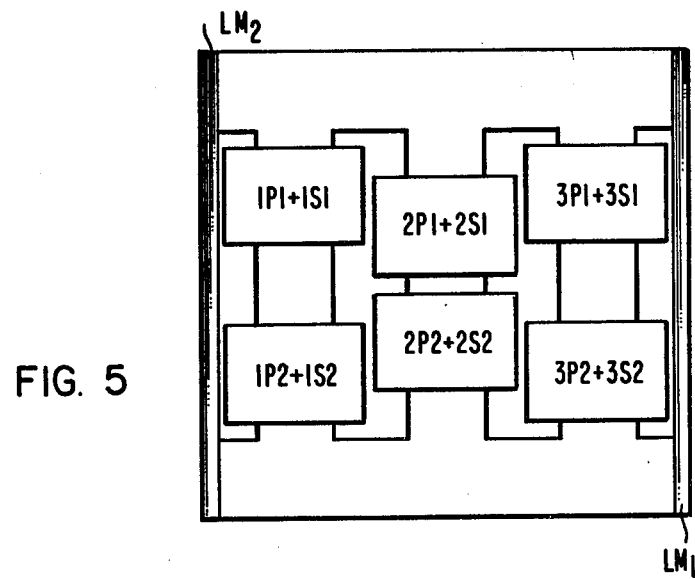

Referring to FIGS. 4 and 5, the six coils of FIGS. 1 and 2 are shown mounted on a three-legged planar magnetic core. On each leg are disposed two coils which are diametrically opposed on the hexagon. The first coil (1P1, 1S1) is on the upper portion, the second coil (1P2, 1S2) is on the lower portion of the left leg. Similarly, on the central leg of the transformer is mounted coil (2P1, 2S1) on the upper portion, coil (2P2, 2S2) on the lower portion thereof. Finally, on the right leg of the magnetic core are mounted, one above the other, coil (3P1, 3S1) and coil (3P2, 2S2). Taps X and Y are provided, X toward the P side, Y toward the Q side of each secondary winding, on either side of the middle and common point CP.

As shown in FIG. 2, in order to minimize the asymmetry in the coupling between secondary and primary windings in each coil, and to make the magnetic coupling of each turn on the secondary with each turn of the primary as constant as possible along the coil (thereby ideally to have each secondary turn on one coil in the same relationship to every turn of the primary, and each turn in the same relationship to each turn of another coil in a one-to-one relationship) the secondary is folded on itself about its middle point CP, thereby having approximately the height of the primary winding, and the folded portions are distributed between opposite faces of the primary winding. FIG. 2 shows a secondary winding which when stretched has about twice the height of the associated half primary winding Pr. The two half secondaries obtained by folding about the common point CP are $C_1$ and $C_2$ on either side of the primary Pr. As a result of this approach, the geometrical length of the secondary relative to the geometrical length of the associated primary can be maximized without any substantial detriment in the distributed leakage reactance and without a marked loss of compactness in the assembled coil. Six identical coils are so disposed regularly about the sides of the hexagon. Each coil has taps (X and Y) on either sides of half secondary windings $C_1$, $C_2$ and at the same level from the start and finish leads P, Q therefrom. In addition, as explained hereinafter by reference to FIGS. 6 and 7A–7D, the coils are, in accordance with the invention, disposed by pairs on the three legs of the transformer (FIGS. 3, 4 and 5) in opposition on each pair of the six coils admit an axis of symmetry about the central leg thereof. This general organization of the coil themselves and their distribution and orientation by pairs on the three legs of the transformer afford several advantages, besides the inherent compactness, electrical quality and coil similarity mentioned heretofore by reference to FIG. 2.

First, the secondary winding of a coil has two layers with the start and finish leads (P, Q) on the same end of the coil, e.g., the end opposite to the common point CP thereof. Thus, the secondary turns between X and P, and those between Y and Q are as coincident as in practical in relationship to the primary, which brings about adequate symmetry of the commutating reactances as required with the intended haxagon scheme. The symmetry and electrical quality are increased by the choice of coils in opposition on each leg.

In order to maintain the hexagon vectorial relationship and keep the symmetry, several measures being taken when placing the primary and secondary windings of the six coils in coupling relation on the three-legged magnetic core.

First, the commutating reactances must have the proper absolute value and be nearly the same for all sets of coils. Therefore, the six coil subassemblies must be electrically and physically identical. As seen hereinafter, each coil is comprised of an inner half-primary winding Pr sandwiched between two half secondary windings. The half-secondary windings are disposed one IW inside the associated half primary winding Pr, the other OW to the outside.

Thus, the six coils of FIGS. 4 and 5 actually include, each, three concentrical coils. The inner and outer half-secondary windings (IW, OW) have a common point CP at one end and two outcoming leads at the other end, representing one the starting end P, the other the finishing end Q, for the overall secondary winding.

Still, the six coils would not have the same contribution to the commutating reactance because of the physical configuration of the three-phase core. The coils on the center leg have core iron on two sides, whereas the coils on the outside legs have regular core iron on only one side. In addition, the two outside legs are physically closer to the inner leg than to each other. In order to improve the balancing of the commutation reactance, two measures have been taken, as shown in FIGS. 4 and 5. Two laminated magnetic structures $LM_1$, $LM_2$ are provided between the upper and lower transversal cores. These act as a fourth and a fifth leg of the core outside the coil assembly. These enhance the quality of the magnetic environment for the outside coils. As a result, these coils become less different than the coils of the center leg. Moreover, the fourth and fifth legs act as magnetic shunts to magnetically isolate the outside coils from external magnetic influence such as cabinet walls, magnetic objects, stray fields, thereby eliminating adverse effects due to proximity when packaging the transformer. Also, the leakage flux from the outside coils is contained, thereby keeping time-varying flux out of the cabinet walls, and eliminating as well eddy current losses therein.

A further advantage is that the magnetic shunts are integral with the transformer. As a result, checking for balance of commutating reactance, and testing of performance are final procedures which can be conducted with less concern for the proximity to external magnetic material at the final packaging stage.

Another step taken, according to one embodiment of the present invention, in order to further achieve compensation for the asymmetrical disposition of the two center coils relative to the two outer coils consists in displacing the latter relative to the center-coils symmetrically about the transverse median plane of the three legs. As shown in FIGS. 4 and 5, the higher coils of the outer coils are higher on their legs than the higher coil of the central leg, while the lower coils of the outer coils are lower by the same amount than the lower coil of the central leg.

Figure 6:
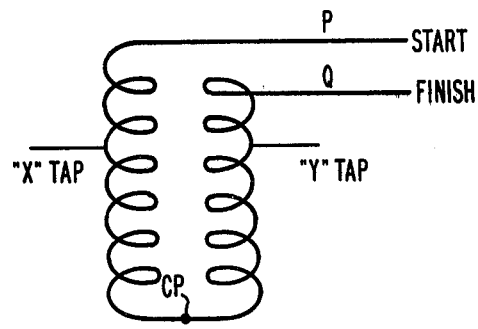
FIG. 6 shows the spatial disposition of the two half secondary windings of a coil of FIG. 2 or FIG. 3.

Referring to FIG. 6, the two half-windings C1, C2 of the secondary winding in a coil such as shown in FIG. 2 are illustrated with their midpoint CP and respective X and Y taps. The outside leads to the secondary winding are P for the "start" polarity side of one winding (C1 or C2), and Q for the "finish" polarity side of the other winding (C2 or C1). Both are at one end opposite to the common end CP of the secondary winding.

From the inherent asymmetry of the secondary coil shown in FIG. 6, it appears that within each of the coils of FIGS. 4 and 5, either one of two orientations relative to the transformer leg is possible. Referring to FIGS. 7A–7D, all the orientations possible are symbolized by a U pointing either up, or down on the associated leg, thereby representing four different patterns obtained with a definite choice of orientations. FIG. 7A has all the six coils with the closed ends, or common end CP, facing one another on each leg. FIG. 7B is the opposite of FIG. 7A, with the common ends CP to the outside on each leg. FIG. 7C and 7D combine the orientations of FIG. 7A and 7B. In FIG. 7C, two common ends of opposite coils on a leg are along the central leg close to one another, the common ends are to the outside of the other legs. In FIG. 7D, it is the reverse of the situation in FIG. 7C.

Figure 8C:
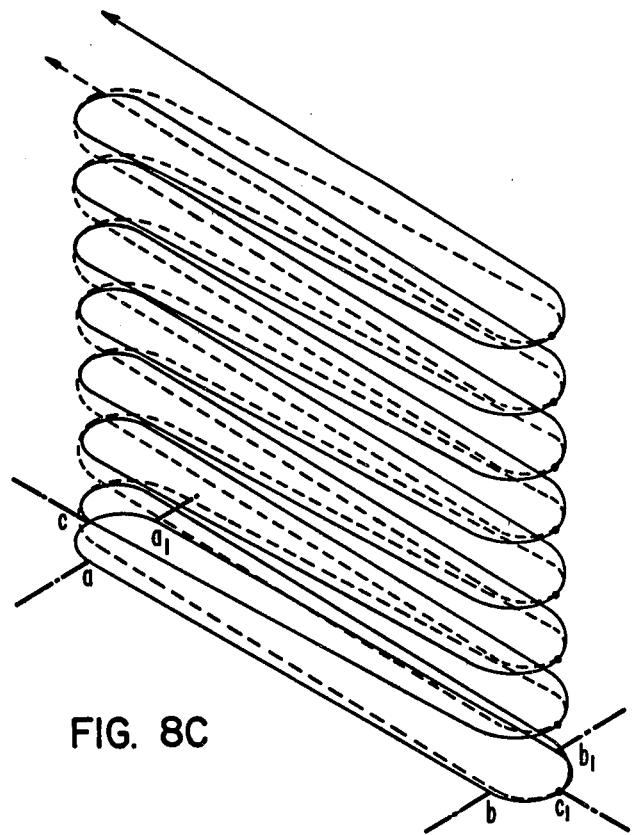
FIG. 8C shows the two half secondary windings of FIGS. 8A, 8B together relative to a common base projection but without the associated half primary winding.
Figure 8A:
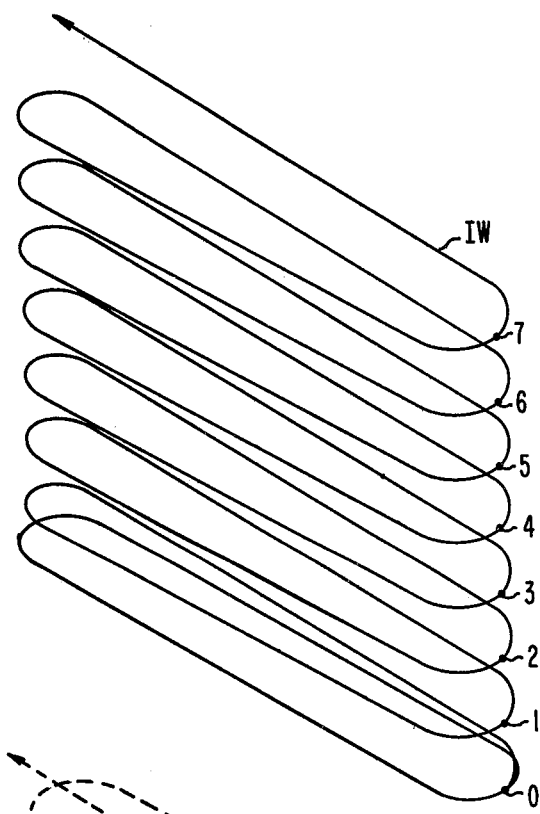
FIGS. 8A and 8B respectively illustrate the turn geometry of the two opposite halves of one secondary winding with a given constant pitch.

FIG. 8A schematically shows the coil with one half secondary disposed as an inner winding IW in a specific example where there is substantially a constant pitch of 2.025 degrees and seven turns counted from the common point CP.

Figure 8B:
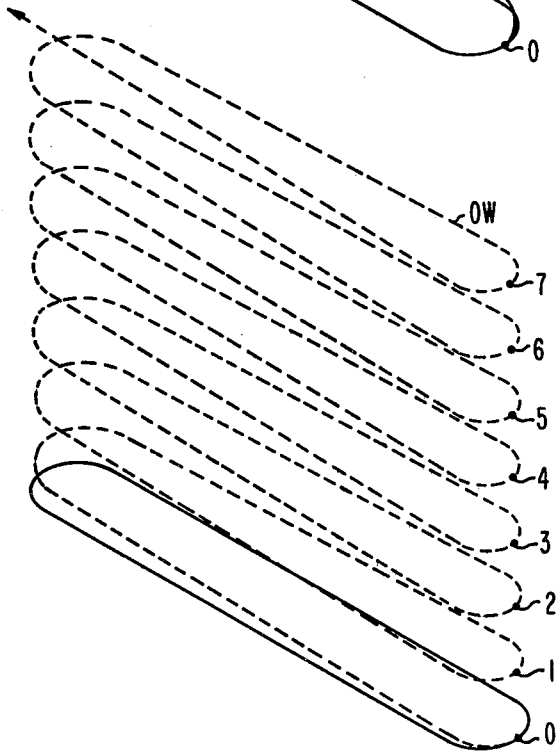
Figure 11A:
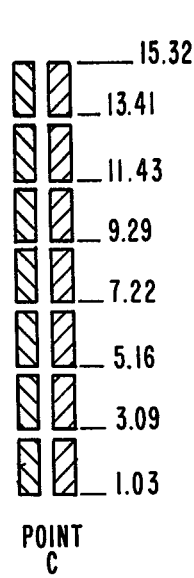
Figure 11B:
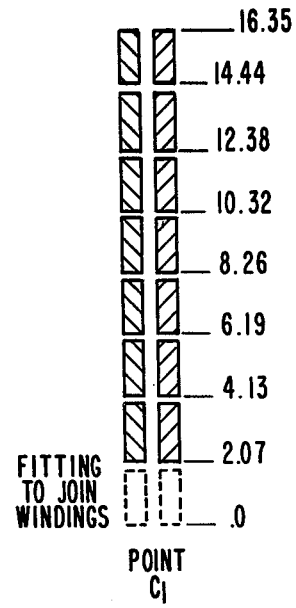

In FIG. 8B is shown the opposite half secondary winding as an outer winding OW with substantially a constant pitch of 1.863° and the same number of turns as IW of FIG. 8A.

FIG. 8C is illustrative of the two coils IW, OW of FIGS. 8A, 8B, together in spatial relation with two opposite directions of gyration from the common point CP. Across the common base in projection, are shown three traces a—$a_1$, b—$b_1$, and c—$c_1$, of three planes of cross-section perpendicular to the base.

As illustrated on FIGS. 8A, 8B, 8C, the coils have a straight portion between two quasi-circular ends. Trace a—$a_1$, indicates a plane containing the centers of curvature of the circular end close to the ingoing and outgoing leads P, Q. Trace b—$b_1$ indicates a plane containing the centers of curvature of the circular end close to the common point CP. Trace c—$c_1$ indicates a longitudinal plane of symmetry extending from one end to the other end of the coil passing by the common point CP.

FIGS. 9A, 9B, 10A, 10B and 11A, 11B illustrate the conductor cross-sections by planes along a—$a_1$, b—$b_1$ and c—$c_1$, respectively. The common conductor in the example has a cross-section of $0.64 \times 1.9$ (in centimeters), and is coiled on IW and OW with respective constant pitches of 2.025 and 1.863 degrees.

Considering FIGS. 9A and 9B, namely the cross-sections above points a and $a_1$, the conductors for the outer winding OW and for the inner winding IW are positioned above the base with the following respective position levels indicated in centimeters by Table I for point a, by Table II for point $a_1$:

TABLE I

| | (Point a) (FIG. 9A) | |
|---|---|---|
| Turns | OW | IW |
| | .76 (lower edge of lowest turn) | 1.28 (lower edge) |
| 1 | 2.83 | 3.34 |
| 2 | 4.89 | 5.41 |
| 3 | 6.96 | 7.47 |
| 4 | 9.02 | 9.53 |
| 5 | 11.09 | 11.60 |
| 6 | 13.20 | 13.67 |
| 7 | 15.22 | 15.57 (upper edge) |

TABLE I-continued

| | (Point a) (FIG. 9A) | |
|---|---|---|
| Turns | OW | IW |
| | 17.12 (upper edge of highest turn) | |

TABLE II

| | (Point $a_1$) (FIG. 9B) | |
|---|---|---|
| Turns | OW | IW |
| | .78 (lower edge of lowest turn) | 1.31 (lower edge) |
| 1 | 2.86 | 3.38 |
| 2 | 4.92 | 5.44 |
| 3 | 6.99 | 7.51 |
| 4 | 9.05 | 9.57 |
| 5 | 11.11 | 11.64 |
| 6 | 13.18 | 14.46 |
| 7 | 15.24 | 15.61 (upper edge) |
| | 17.15 (upper edge of highest turn) | |

Similarly, Table III for point b; Table IV for point $b_1$; Table V for point c and Table VI for point $c_1$ contain data by reference to FIGS. 10A, 10B, 11B, 11C, as follows:

TABLE III

| | (Point b) (FIG. 10A) | |
|---|---|---|
| Turns | OW | IW |
| | .27 (lower edge of lowest turn) | 1.82 (lower edge) |
| 1 | 2.33 | 3.88 |
| 2 | 4.40 | 5.95 |
| 3 | 6.46 | 8.01 |
| 4 | 8.53 | 10.08 |
| 5 | 10.59 | 12.14 |
| 6 | 12.66 | 14.21 |
| 7 | 14.72 | 16.11 (upper edge) |
| | 16.63 (upper edge of highest turn) | |

TABLE IV

| | (Point $b_1$) (FIG. 10B) | |
|---|---|---|
| Turns | OW | IW |
| | .25 (lower edge of lowest turn) | 1.79 (lower edge) |
| 1 | 2.31 | 3.85 |
| 2 | 4.38 | 5.92 |
| 3 | 6.44 | 7.98 |
| 4 | 8.51 | 10.05 |
| 5 | 10.57 | 12.11 |
| 6 | 12.64 | 14.18 |
| 7 | 14.70 | 16.08 (upper edge) |
| | 16.61 (upper edge of highest turn) | |

TABLE V

| | (Point c) (FIG. 11A) | |
|---|---|---|
| Turns | OW | and IW |
| | | 1.03 |
| 1 | | 3.09 |
| 2 | | 5.16 |
| 3 | | 7.22 |
| 4 | | 9.29 |
| 5 | | 11.43 |
| 6 | | 13.41 |
| 7 | | 15.32 |

TABLE VI

| | (Point $c_1$) (FIG. 11B) | |
|---|---|---|
| Turns | OW | and IW |
| | | .0 |
| 1 | | 2.07 |
| 2 | | 4.13 |
| 3 | | 6.19 |
| 4 | | 8.26 |
| 5 | | 10.32 |
| 6 | | 12.38 |
| 7 | | 14.44 |
| | | 16.35 |

Figure 12:
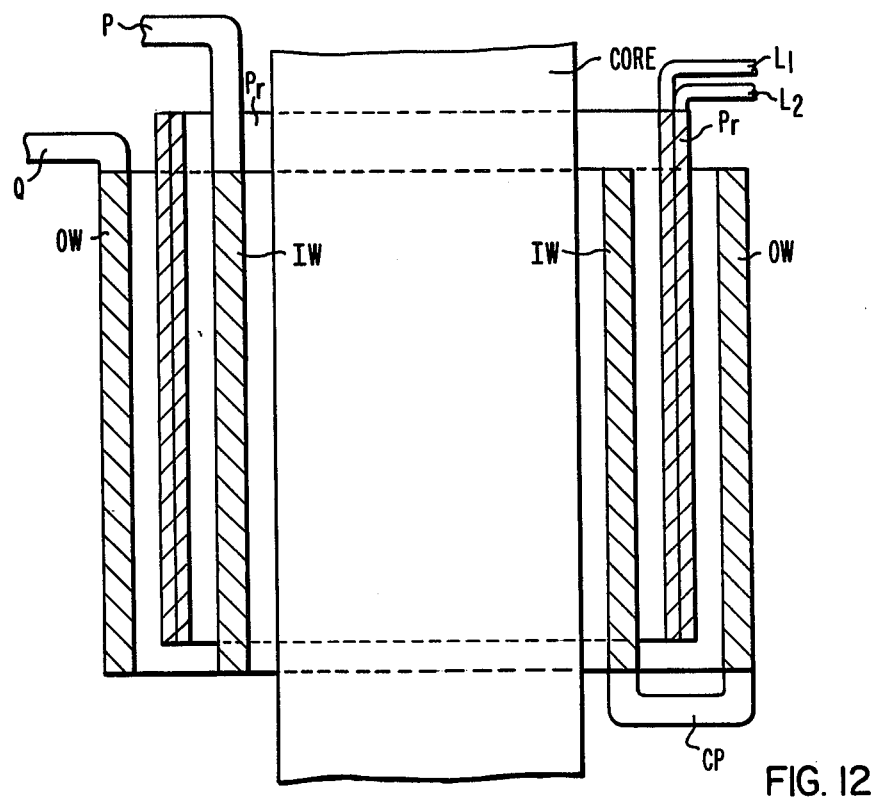
FIG. 12 is a schematic representation of the primary winding sandwiched between an inner and an outer half secondary winding.

Referring to FIG. 12, one set of coils is shown diagrammatically assembled around one leg of the transformer. The half primary winding Pr is shown with one lead $L_1$ and another lead $L_2$. The leads $L_1$ and $L_2$ could be, as shown in FIG. 1, one lead corresponding to one phase line A, B or C, or to the neutral line N, the other lead being the interconnecting lead between two primary half windings $P_1$, $P'_1$, $P_2$, $P'_2$, or $P_3$, $P'_3$.

The half winding Pr is mounted between two half secondary windings OW and IW. The leads are P and Q as shown in FIGS. 1 and 2, and there is a common point CP at the other end of the secondary coil.

Figure 13A:
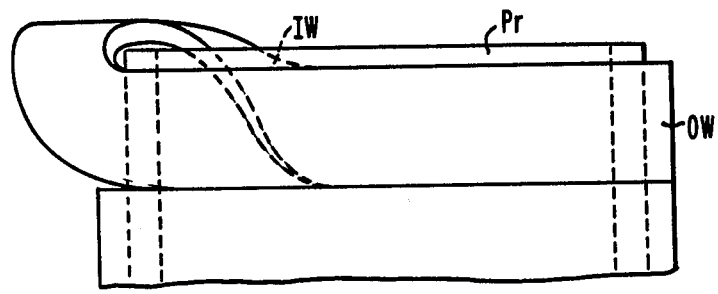
FIGS. 13A–13C are the side, rear and top views, respectively, of the transition and transposition portion of the secondary winding conductor passed over the primary winding and connecting the two half windings about their common point.
Figure 13B:
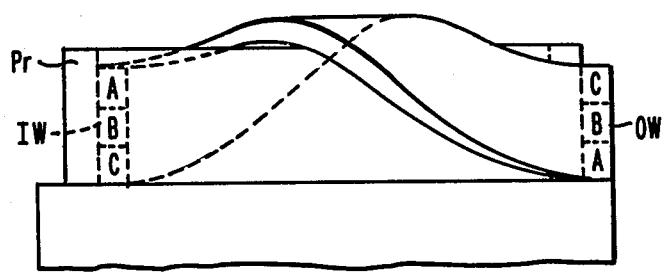
Figure 13C:
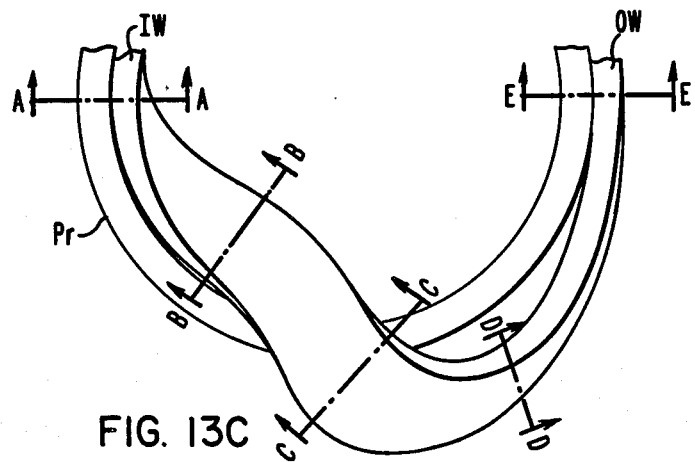

Assuming the conductor of the half-secondary windings is composed of three conductors A, B, C one sitting on one edge of the other, FIGS. 13A, 13B and 13C are illustrative of how transition and transposition is effected about the common point zone in order to pass from one coil to the next over the edge of the primary winding Pr, so as to provide an extension of the conductor between IW and OW as short as possible.

FIG. 13C shows five successive cross sections AA, BB, CC, DD and EE across the connecting zone about common point CP. The resulting successive orientations of the conductor cross section with the three elementary conductors ABC therein, are shown by FIG. 14A, 14B, 14C, 14D and 14E, respectively.

Section AA on FIG. 14A shows the leaving end of the conductor ABC still along the inside of the primary winding Pr. Section BB of FIG. 14B shows the conductor transition of IW when the upper edge (conductor A) is somewhat lowered along the inner face of the primary winding in order to accommodate raising of the lower edge (conductor B) away from the primary winding inner wall, during rotation. Section CC (FIG. 14C) shows the connection between IW and OW half-way through, e.g., laying on the edge of the primary winding Pr. In that position conductor A is closest to the inner wall while conductor C is closest to the outside wall of the primary winding. At this time, cross section CC represents a plane at 90° to the original plane of cross section AA. At the same time, the conductor is oriented at 90° to what its position was along the inner wall as part of IW. Section DD (FIG. 14D) indicates that the conductor is now touching the outer wall with what originally was the lower edge (conductor C) while the former upper edge (conductor A) has been rotated downward and stands lower. The final orientation (FIG. 14E) is when the conductor has become part of the outer winding OW with the transposition complete, conductor A forming the lower edge and conductor C forming the upper edge along the side of the outside wall of the primary winding Pr. FIGS. 13A and 13B illustrate in a side view and rear view, respectively, how the conductor of the inner winding IW passes flat upon the edge of the primary winding to become part of the outer winding OW by the transition and transposition process illustrated on FIGS. 14A-14E.

FIGS. 15A-15D illustrate the steps needed to implement the method of FIGS. 14A-14E. First, the inner winding IW is coiled from its lead P to the connecting point CP. FIG. 15A shows the first step. The second step shown by FIG. 15B shows the primary coil $P_2$ being slided, after being prewound, into position as shown in FIG. 12. The implementation according to FIGS. 13A-13C and FIGS. 14A-14C of the transition and transposition steps takes place at this stage.

FIG. 15C shows the stage at which these transition and transposition steps are taken about the edge of the positioned primary winding.

FIG. 15D illustrates the coiling process of the outer winding OW on the primary winding Pr, the conductor having reached the fully transposed orientation of FIG. 14E.

Referring to FIG. 3 showing the six secondaries of FIGS. 1 and 2 as disposed by pairs on the three legs of the transformer of FIGS. 4 and 5, the start, or P leads, are connected together from one top coil to a bottom coil along the hexagon in one direction. The same situation occurs, alternately, between the finish, or Q leads of two consecutive coils along the hexagon in the same direction, as illustrated.

In accordance with one aspect of the present invention, the start and finish leads start, or end, on the same side opposite to the common point CP (FIG. 2). Taking advantage of this disposition with the two pairs of coils in opposition on each leg (FIGS. 7A-7D), the leads from one coil are brought along the length of the other coil in order to bring the four leads altogether on one side of both coils along the leg. In this fashion, four parallel conductors are available for interconnection transversely between the P's and the Q's within closely spaced planes across the three legs of the transformer as illustrated by FIGS. 16A, 16B, 16C and 16D which correspond to the patterns of FIGS. 7A, 7B, 7C, and 7D, respectively.

Figure 16A:
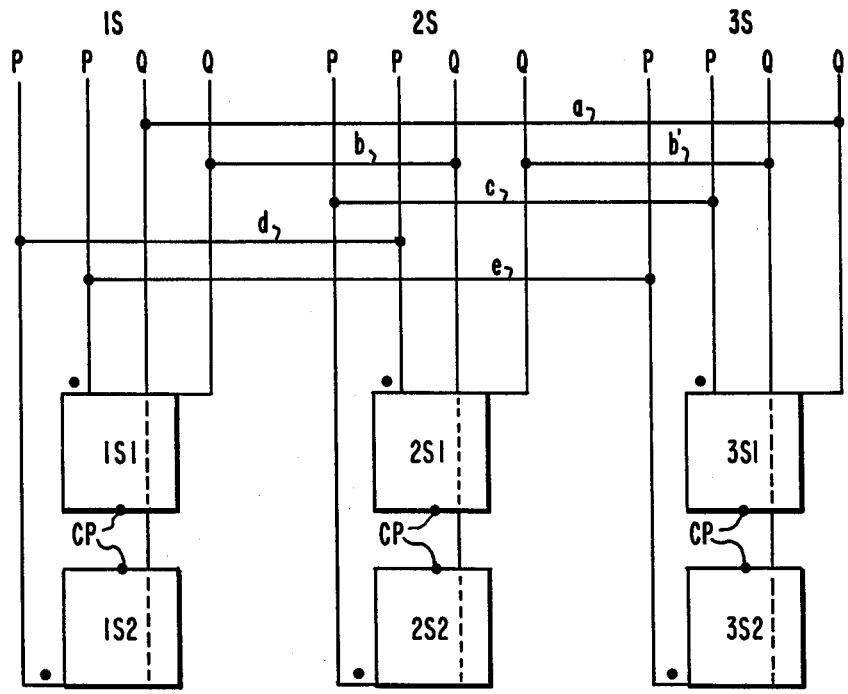
FIGS. 16A–16D show the six coils under the respective configurations on the transformer of FIGS. 7A–7D, with the interconnections on parallel levels above the six coils.
Figure 16B:
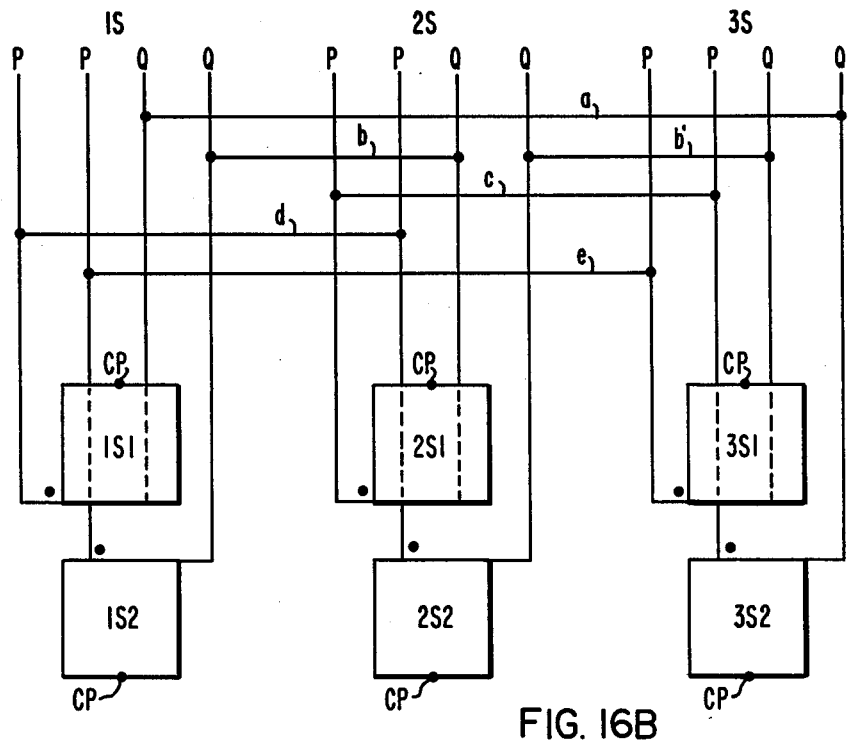
Figure 16C:
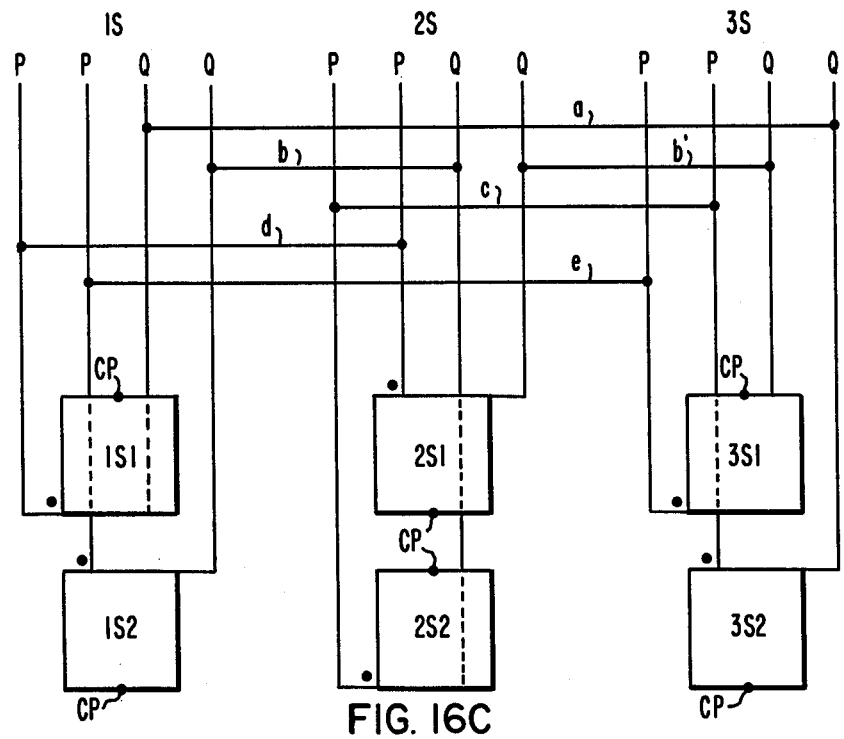
Figure 16D:
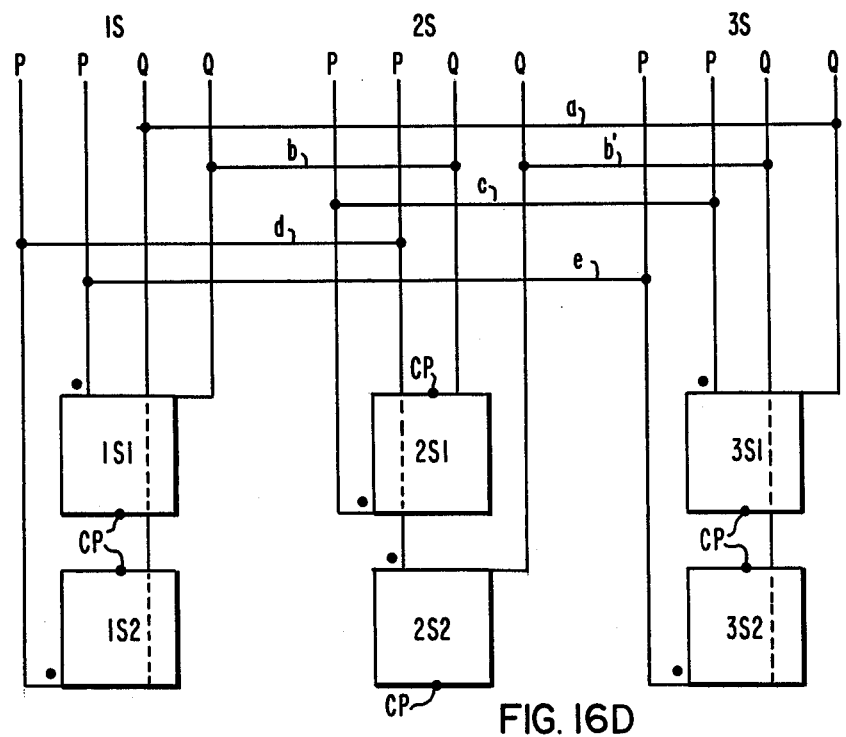

The interconnection are: a between the A leads of coils of different outer legs and at the same time of different levels thereon; b and b' on FIGS. 16A-16C cover connections between Q leads of one outer leg coil and one central leg coil; c are between P leads of one central leg coil and one right outer leg coil, while the d connections are between P leads of one central leg coil and one left outer leg coil; and the e connections are between P leads of different outer leg coils and of different levels thereon.

Figure 17:
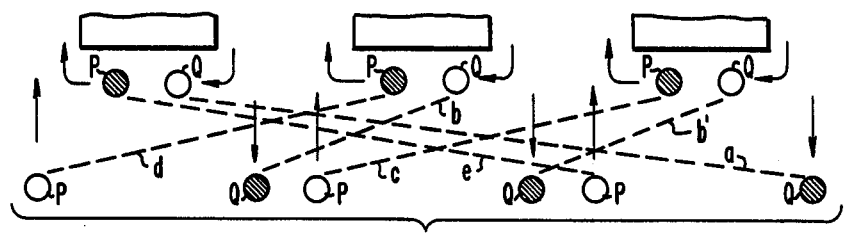
FIG. 17 shows in relation to FIG. 3 and FIGS. 16A–16D how the finish (Q) and the start (P) leads of the secondary windings on the three legs of the magnetic core are interconnected to achieve the hexagon serial connection between coils.

FIG. 17 shows from the top of the six coils the arrival of the different vertical conductors and the interconnections a-e for the P and Q leads.

Figure 18A:
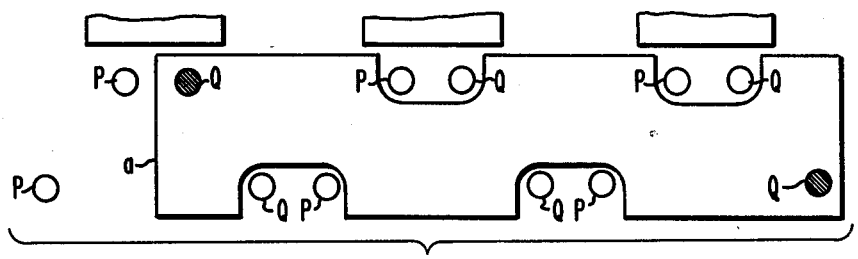
FIGS. 18A–18E are four successive levels showing a connecting plate between P's and/or Q's leads from the coils of the transformer in place as shown by FIG. 17.
Figure 18B:
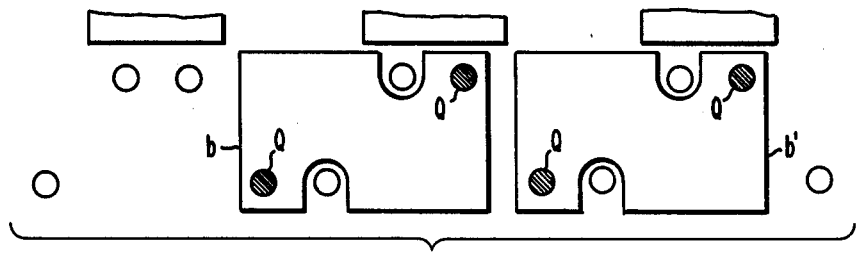

The interconnections a-e are made of conducting plates provided with slots for the free passage of conductors which are not involved with the particular connection. FIG. 18A is the a connection between two vertical Q conductors shown shaded, as opposed to the non-shaded Q and P vertical conductors passing freely across the particular plate a.

Figure 18C:
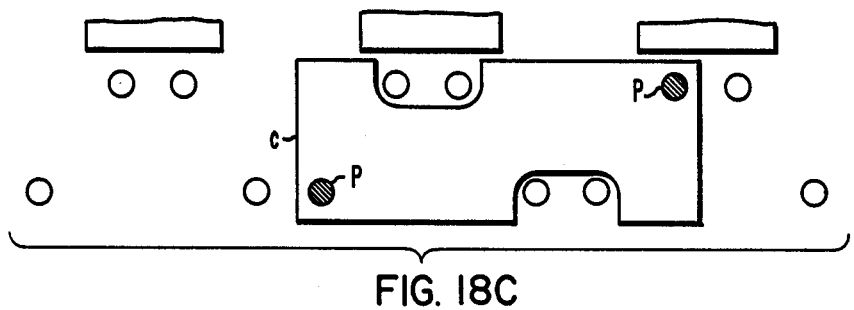
Figure 18D:
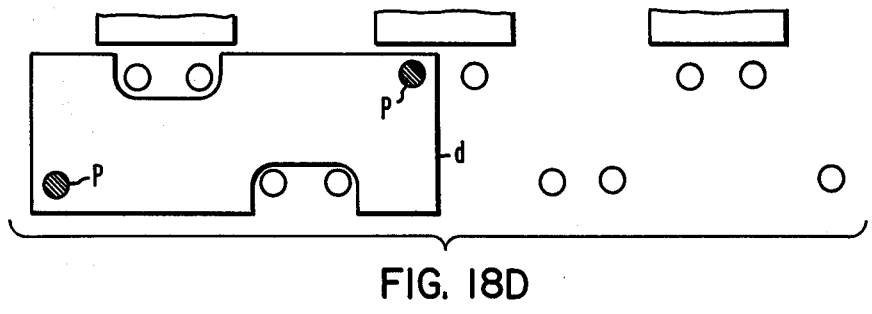
Figure 18E:
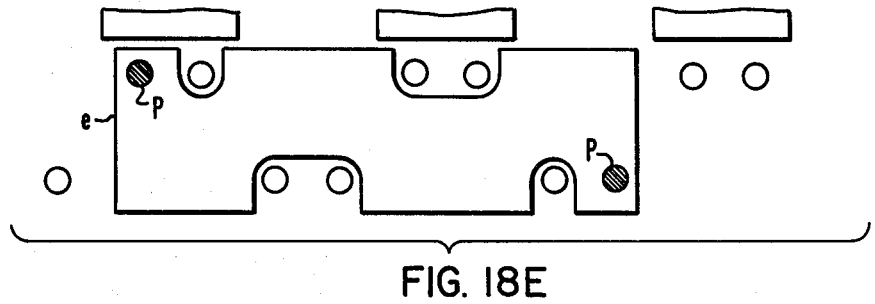

18B shows the b and b' at the same level. Plates a and (b, b$_1$) are at two different levels one above the other. Similarly, FIG. 18C shows the C plate and FIG. 18D the d plate also at different levels. The e plate of FIG. 18E is at the fifth level like on FIGS. 17A-17D.

Figure 19A:
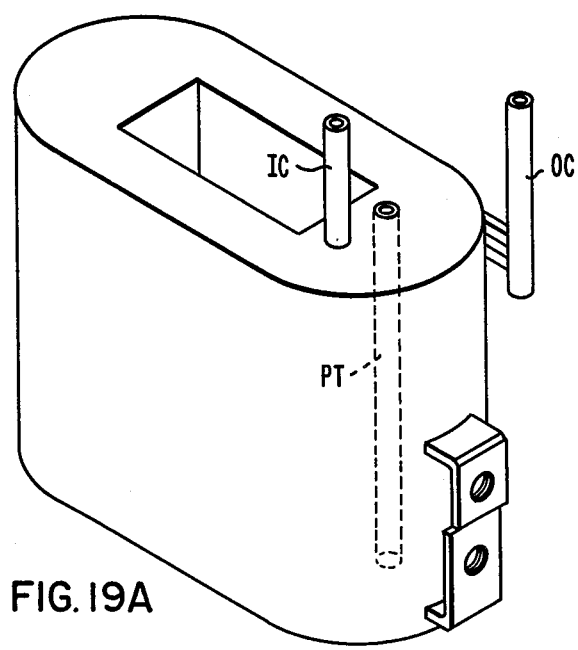
FIG. 19A typically shows an insulated coil as would be placed on a transformer leg at the top in accordance with FIGS. 4 and 5.
Figure 19B:
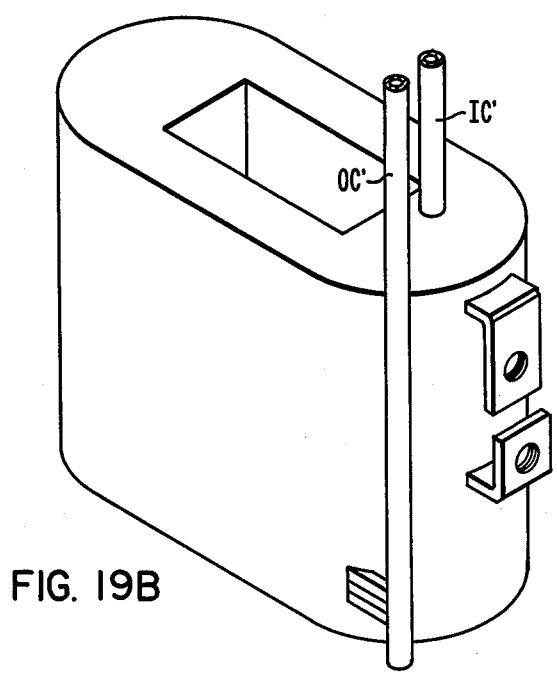
FIG. 19B typically shows a bottom coil which would be placed below a coil like shown in FIG. 18A.

Referring to FIG. 19A and FIG. 16A, a top coil such as 1S1, 2S1 or 3S1 is illustrated with the insulation and the electrical terminals IC from the inner secondary IW and OC from the outer secondary OW. Within the space defined by the inner secondary IW passageway is provided by a phenolic tube PT of the dimension of the electrical terminal IC' passed from the inner secondary IW of the lower coil (1S2, 2S2 or 3S2). Referring to FIG. 19B, the lower coil, which is complementary of the upper coil of FIG. 19A, has an outer conductor OC' and an inner conductor IC'. The latter is passed through the phenolic tube PT of the upper coil, as earlier explained. In the instance of FIG. 17A, as shown on FIGS. 19A, 19B, the common points CP are facing each other when installed. The outer and inner conductors of the coils are to the extreme ends but brought all together above the two coils in this instance.

Figure 19C:
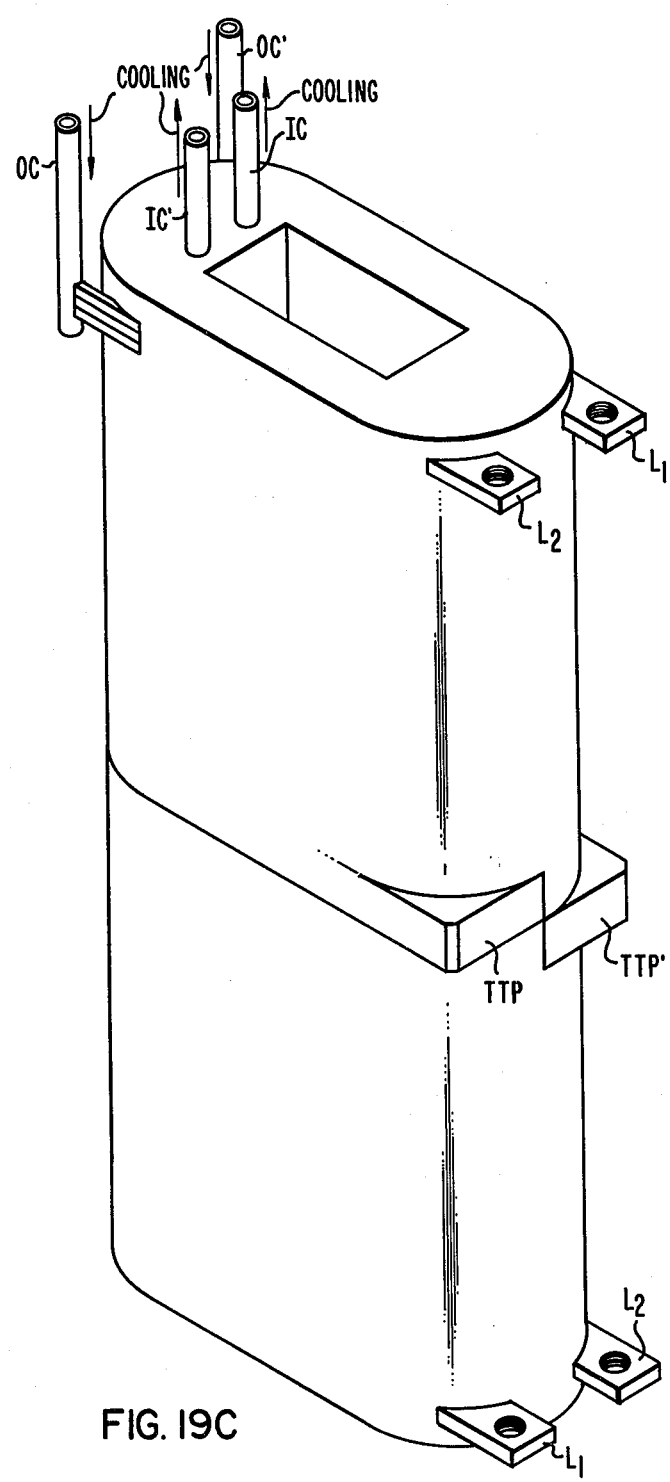
FIG. 19C shows the insulated coils of FIGS. 19A and 19B when placed above one another in accordance with the pattern of FIG. 7A, the central coils under the pattern of FIG. 7C or the coils on the outer legs under the pattern of FIG. 7D, e.g. with the transposition and transition positions of the coils adjacent to one another.

FIG. 19C shows the two coils in position one on top of the other, but seen from the opposite side relative to FIGS. 19A and 19B, thereby to show the transition and transposition portion TTP for the upper coil and TTP' for the lower coil. By reason of symmetry, due to a slight excentricity, the two portions TTP and TTP' do not abut against one another, but are rather slightly displaced to adjoin while resting on the other coil. Referring to FIG. 12, the two primary terminals $L_1$, $L_2$ appear also on FIG. 19C on the side of the TTP and TTP' portions thus opposite to the secondary terminals IC, IW, IC', IW'.

Coolings provided by taking advantage of the particular design of the secondary, internal cooling of IW and OW via IC and OC, (and IC', OC' for the lower coil) favorably cools the primary winding Pr which is sandwiched therebetween.

For the purpose of this description, U.S. Pat. No. 4,255,784 of John Rosa is hereby incorporated by reference.

We claim:

1. In a 12-pulse transformer/rectifier apparatus for converting three-phase AC to DC, from a three-phase primary through a twelve-phase hexagonally distributed secondary, the combination of:
    two half primary winding associated across the opposite side of the hexagon to respective secondary windings, to form six primary-secondary coils,
    each of said coils including two half secondary windings of same height as said half primary winding having a common point at one end, having a start and a finish lead at the opposite end, said half-primary winding being sandwiched between said two half secondary windings;
    said coils being distributed by pairs on three legs of a magnetic core so that the coils of one pair belong to opposite sides of the hexagon and are oriented in opposition on the same leg, but symmetrically in relation to the central leg of the magnetic core.

2. The apparatus of claim 1 with the secondary leads of same polarity from one coil to the next along the hexagon being connected to one another.

3. The apparatus of claim 2 with the secondary leads from each coil on the magnetic core being brought along a common direction, and interconnectors being provided normal to said direction between the respective leads in accordance with the hexagonal distribution of the secondary windings.

4. The apparatus of claim 3 with means for cooling the secondary of each coil internally through the start and finish leads thereof.

5. In an hexagon transformer including three primary windings and six secondary windings equally distributed on a planar three-leg magnetic core, the combination of:

each of said primary windings having two half-windings associated with opposite sides of the hexagon, respectively;

each of said secondary windings being relative to one corresponding side of the hexagon and including two half secondary windings;

one half primary winding being sandwiched between two half secondary windings of the same hexagon side;

six identical coils each formed of one half primary winding and two half secondary windings, said coils being so electrically connected that they are adjacent along the hexagon by the same polarity, and said coils being mounted by pairs so that the coil of one hexagon side being mounted on a common magnetic core leg with a similar coil for the opposite hexagon side.

6. The hexagon transformer of claim 5 with each of said coils having at one end thereof a common point between the two associated half secondary windings and a start and a finish lead from opposite associated half secondary windings at the other end thereof;

said six secondary windings being serially connected from one to the next in an hexagonal fashion by connecting one start lead of one coil to the start lead of the adjacent coil along the hexagon in one direction, and one finish lead of said one coil to the finish lead of the adjacent coil along the hexagon in the opposite direction; and said coils being oriented in opposition to one another on each leg, and said coils admitting symmetry of orientation about the central leg of the magnetic core.

7. The hexagon transformer of claim 6 with said magnetic core having transverse cores extending in the plane thereof beyond the coils of the first and third leg, and with a respective first and second parallel magnetic shunts being provided in close relationship and outside the secondary windings relative to the pairs of coils of said first and third leg.

8. The hexagon transformer of claim 7 with the two coils of the first and third leg being symmetrically disposed relative to the two coils of the second leg, and with said two coils of the first and third leg being symmetrically displaced thereon relative to the two coils of the second leg.

9. The hexagon transformer of claim 8 with said magnetic shunts consisting of magnetic plates transverse to the plane of said magnetic core.

10. The hexagon transformer of claim 6 in combination with two sets of rectifier devices associated with respective opposite polarities of a DC output with said primary windings being supplied with AC power from an AC input;

each of said half secondary windings having a tap, the taps of a common secondary winding being associated with respective rectifier devices of opposite polarities;

said hexagon transformer and two sets of rectifier devices forming a polygonal symmetrical arrangement.

11. In a transformer having a primary winding and a secondary winding mounted on a magnetic core, the combination of:

said secondary winding including two substantially identical secondary coils in series about a common junction point, one secondary coil being disposed inside said primary winding and the other secondary coil being disposed outside said primary winding, with respective terminal conductors at one end, said common junction point being at the other end of said two secondary coils, said two secondary coils being coiled in opposite directions to one another.

12. The transformer of claim 11 with said two secondary coils having a common conductor transposed about said common junction point from one coil to the other over the primary winding by rotation at 180° from one wall of said primary winding to the opposite wall thereof.

13. The transformer of claim 12 with said primary winding being slid into position on top of one of said two coils as the inner secondary coil, and the other of said two coils being wound in situ as said outer secondary coil on top of said primary winding with said common transposed conductor.

14. An hexagon transformer including six identical coils according to claim 13, said hexagon transformer having on opposite sides of the hexagon two identical primary windings forming one phase of the hexagon transformer; with each inner coil of a secondary on one side of the hexagon being connected to the outer coil of a secondary on the adjacent side of the hexagon in the same direction of rotation along the hexagon, and with each outer coil of a secondary on one side of the hexagon being connected to the inner coil of a secondary on the adjacent side of the hexagon in the opposite direction of rotation along the hexagon.

15. A twelve-pulse transformer-rectifier apparatus embodying the hexagon transformer of claim 14, with the two identical primary windings on opposite sides of the hexagon belonging to a delta primary of the apparatus, with each coil of the secondary associated with one primary on one side of the hexagon having a tap;

with at least one rectifier being connected to an associated tap along the hexagon, said taps being connected to opposite DC terminals alternatively from one inner coil to an outside coil along the hexagon; and each tap being so chosen on each individual coil to form a regular hexagon as seen between the two DC terminals and from rectifier to rectifier along the hexagon.

* * * * *